United States Patent [19]
Bolt et al.

[11] Patent Number: 5,807,798
[45] Date of Patent: Sep. 15, 1998

[54] REFRACTORY COMPOSITIONS FOR USE IN FLUID BED CHLORINATORS

[75] Inventors: John Davis Bolt, Landenbert; Ana Estela Diaz, Chadds Ford, both of Pa.; Kurt Richard Mikeska, Wilmington, Del.

[73] Assignee: E. I. du Pont de Nemours and Company, Wilmington, Del.

[21] Appl. No.: 962,851

[22] Filed: Nov. 3, 1997

Related U.S. Application Data

[63] Continuation-in-part of Ser. No. 771,564, Dec. 20, 1996, abandoned.

[51] Int. Cl.⁶ .................................................. C04B 35/10
[52] U.S. Cl. ........................... 501/94; 501/128; 501/133; 210/754
[58] Field of Search ..................... 501/128, 133, 501/127, 153, 154, 134, 94; 210/754

[56] References Cited

U.S. PATENT DOCUMENTS

| | | |
|---|---|---|
| 3,808,013 | 4/1974 | Manigault . |
| 3,813,225 | 5/1974 | Cook . |
| 3,942,293 | 3/1976 | Cook . |
| 4,735,925 | 4/1988 | Kato et al. ............................. 501/128 |
| 5,096,857 | 3/1992 | Hu et al. . |

FOREIGN PATENT DOCUMENTS

| | | |
|---|---|---|
| 2 672 527 | 8/1992 | France . |
| 0 614 073 | 5/1978 | U.S.S.R. . |
| 0614073 | 5/1978 | U.S.S.R. . |
| 0 644 747 | 3/1979 | U.S.S.R. . |

OTHER PUBLICATIONS

R.W. Ricker and F.A. Hummel, Reactions in the System TiO2–SiO2; Revision of the Phase Diagram, *Journal of The American Ceramic Society,* 34, No. 9, 271–279, Sep. 1951.

Modern Refractory Practice, Fifth Edition, Haribson Walker Refractories, Copyright 1992 Harbison–Walker Refractories, pp.: iii, DM–14—DM–20, PD–6 and PDF–9.

*Primary Examiner*—Paul Marcantoni

[57] ABSTRACT

This invention provides new refractory binder compositions comprising silica and titania which can be used to make ceramic bodies, particularly bricks. The refractory binder compositions comprise about 70 to about 92 wt. % silica ($SiO_2$) and about 8 to about 30% titania ($TiO_2$). The refractory binder compositions may further comprise alumina and a metal oxide selected from the group consisting of calcium oxide, strontium oxide, and sodium oxide, and mixtures thereof. The refractory ceramic bodies can be used in hot corrosive/erosive environments such as in fluid bed chlorinators in the manufacture of titanium dioxide.

12 Claims, No Drawings

REFRACTORY COMPOSITIONS FOR USE IN FLUID BED CHLORINATORS

CROSS-REFERENCE TO RELATED APPLICATIONS

This application is a continuation-in-part of U.S. patent application Ser. No. 08/771,564 having a filing date of Dec. 20, 1996, now abandoned.

BACKGROUND OF THE INVENTION

1. Field of the Invention

The present invention relates to new refractory ceramic materials comprising refractory binder compositions comprising silica ($SiO_2$) and titania ($TiO_2$) which can be used to make ceramic bodies, particularly bricks. These refractory ceramic bodies can be used in hot corrosive/erosive environments such as in fluid bed chlorinators in the manufacture of titanium dioxide.

2. Description of the Related Art

Processes for chlorinating metal containing materials, such as titanium-bearing materials, in chlorination reaction chambers having a fluidized bed are well known. In such processes, particulate coke, particulate titanium-bearing materials, chlorine and optionally oxygen or air are fed into the reaction chamber. Suitable reaction temperature, pressure, and flow rates are maintained to sustain the fluidized bed in the reaction chamber. In the fluidized bed, the titanium-bearing material, chlorine, and carbon undergo a chemical reaction to form essentially gaseous titanium tetrachloride and other metal chlorides, and certain gasses (primarily carbonyl sulfide, sulfur dioxide, carbon dioxide and carbon monoxide). The gaseous titanium tetrachloride and other metal chlorides, and gasses are exhausted from the reaction chamber. The gaseous titanium tetrachloride can then be separated from the other metal chlorides and exhaust gas and used to produce titanium dioxide or titanium metal.

Conditions within the reaction chamber are highly corrosive due to the chemical reaction taking place, reactants and products and highly erosive due to the movement of materials within the chamber. Therefore, the materials used to construct the chamber must be able to tolerate these conditions and have slow corrosion/erosion rates. The interior surfaces of such reaction chambers are commonly lined with refractory bricks resistant to corrosion/erosion. Bricks provide insulation so that the outer (typically metal) shell does not overheat and so that elevated temperatures are maintained in the reaction chamber. Such bricks also provide a barrier to prevent contact of the reaction mass with the outer shell of the reaction vessel and thus the external environment.

These bricks are typically prepared from refractory filler materials and refractory binder materials. Refractory fillers which have been used to prepare bricks to line chlorination vessels include, for example, metal oxides, metal nitrides, metal carbides, aluminum silicates (e.g., fireclay, calcined fireclay (grog), mullite, and cordierite), silicates, aluminates, aluminum phosphates, rare earth phosphate blends, and mixtures thereof. Binders materials used for such bricks include, for example, clay, colloidal materials such as colloidal silica, colloidal alumina, metal nitrides, metal oxides, etc. For instance, the following brick and refractory compositions are known from the art.

Cook, U.S. Pat. Nos. 3,942,293 and 3,813,225 disclose refractory brick compositions of 51 to 53.5% silica, 1.5 to 2.5% titania, 42.5 to 46.5% alumina, and ferrous oxide, calcium oxide, magnesium oxide, and alkali metals in minor amounts. The bricks are described as being useful for lining the interior surface of a chlorination vessel used in the manufacture of titanium dioxide. The surfaces of the bricks are coated with a finely-divided refractory metal oxide having a melting point greater than the operating temperature of the vessel in an amount sufficient to fill substantially all of the surface pores of the brick. Pigmentary titanium dioxide is described as being a suitable metal oxide for coating the surfaces of the bricks.

Manigault, U.S. Pat. No. 3,808,013 discloses a refractory composition comprising from 76 to 96.5% tabular alumina, 0 to 10% calcined alumina, 3 to 10% silica, and 0.5 to 4% of a titanium compound selected from the group consisting of rutile titanium dioxide and barium titanate. This refractory composition is described as being useful for producing fired ceramic bodies having low porosity and absorption and high bulk density.

Hu et al., U.S. Pat. No. 5,096,587 discloses a crystalline composition having an x-ray diffraction pattern essentially the same as the high cristobalite form of silica comprising silica, alumina, and a metal oxide selected from the group consisting of sodium oxide, calcium oxide, and strontium oxide. The compositions are described as may being primarily useful as fillers in glass composite.

Borodai, et al., SU 614073 discloses a process to produce a ceramic material containing quartz glass which comprises grinding the glass, mixing the glass with titanium dioxide, 10–30 wt. %, and molding and firing the material at a temperature of 1100°–1150° C. The ceramic material is stated to have increased dielectric permittivity and mechanical strength relative to materials fired at higher temperatures.

In addition, many commercially available bricks have a composition comprising silica and alumina including bricks available from Thermal Ceramics, Harbison Walker, A. P Green, Cohart Refractories, Holland Manufacturing, Iwao Jiki Kigyo Co., Ltd., Mino Yogyo Co., Ltd., Krosaki, and Fu Shing Ceramic Industries among other companies.

However, some commercial bricks for use in chlorination reactors are still vulnerable to corrosion/erosion over time.

Additional problems of commercial bricks include spalling and thermal shock in which cracks form in the bricks, or total failure of the brick structure may occur. Many refractory filler and binder materials suffer deficiencies in extended performance within chlorination vessels. For example, fillers and binders containing alkali and alkaline earth metals may corrode and leach out as metal chlorides. Silica based binders may become devitrified and the structural integrity of the brick can be reduced. Some refractory fillers such as alumina, zircon, and metal phosphates have poorer than desirable resistance to corrosion/erosion and therefore short lifetimes within the reaction chamber. Still other bricks have significant intergranular boundaries which are more susceptible to corrosion/erosion.

In view of the disadvantages with some commercial brick products, it would be desirable to have an improved brick product suitable for use in hot corrosive/erosive environments such as in chlorination reactors. These brick products could be used to prolong the active life of the reactor by extending the time between which the interior bricks of the reactor require replacement. Replacement of the interior bricks is costly and time-consuming, because it requires shutdown of the reactor.

The present invention provides a new refractory binder composition which can be used to make refractory ceramic materials, especially refractory bricks.

3

These refractory binder compositions demonstrate improved resistance to chlorination over certain known refractory compositions.

SUMMARY OF THE INVENTION

The present invention provides refractory ceramic materials comprising new refractory binder compositions suitable for use in bricks to render the bricks more resistant to hot corrosive/erosive environments such as those present in chlorination reactors. The refractory ceramic materials comprising the refractory binder compositions are typically fired at temperatures of 1400°–1700° C. and should have corrosion rates of no greater than 600 mils/yr. Preferably, the corrosion rate is no greater than 400 mils/yr. and more preferably, no greater than 100 mils/yr.

These refractory ceramic materials comprise binder compositions including for example, a binder composition comprising about 70 to about 92% by weight of silica ($SiO_2$), and about 8 to about 30% by weight of titania ($TiO_2$) based on the weight of the composition. Preferably, the amount of silica is in the range of about 75 to about 90% by weight, and the amount of titania is in the range of about 10 to about 25% by weight.

Another refractory ceramic material of this invention comprises a binder composition comprising about 35 to about 83% by weight of silica ($SiO_2$), about 4 to about 27% by weight of titania ($TiO_2$), and about 10 to about 46% by weight of alumina ($Al_2O_3$) based on the weight of the binder composition. Preferably, the amount of silica is in the range of about 40 to about 73% by weight, the amount of titania is in the range of about 5 to about 24% by weight, and the amount of alumina is in the range of about 20 to about 44% by weight.

A third example of a refractory ceramic material of this invention comprises a binder composition comprising about 35 to about 83% by weight of silica ($SiO_2$), about 4 to about 27% by weight of titania ($TiO_2$), about 10 to about 46% by weight of alumina ($Al_2O_3$), and about 1 to about 8% by weight of a metal oxide selected from the group consisting of calcium oxide (CaO), strontium oxide (SrO), and sodium oxide ($Na_2O$), and mixtures thereof based on the weight of the binder composition. Preferably, the amount of silica is in the range of about 40 to about 73% by weight, the amount of titania is in the range of about 5 to about 24% by weight, the amount of alumina is in the range of about 20 to about 44% by weight, and the amount of metal oxide selected from the group consisting of calcium oxide, strontium oxide, and sodium oxide, and mixtures thereof is in the range of about 3 to about 6% by weight.

The refractory binder composition of the refractory ceramic material may comprise kaolin clay which contains about 45 wt. % alumina and 55 wt. % silica after dehydration. As discussed above, the refractory binder composition may be used to make refractory ceramic bodies such as bricks. The brick may further comprise a refractory filler composition selected from the group consisting of metal oxides, metal nitrides, metal carbides, silicates, aluminates, and mixtures thereof.

The present invention also encompasses methods for using the above-described new refractory ceramic materials. Particularly, these methods involve chlorinating titanium-bearing material, wherein particulate coke, particulate titanium-bearing material and chlorine are reacted in a reactor at a temperature of 900° to 1300° C. and at a pressure of 1 to 3 atmospheres, wherein the reactor has a lining comprising these refractory ceramic materials.

DETAILED DESCRIPTION OF THE INVENTION

The present invention provides a refractory ceramic material comprising a refractory binder composition which can be used to manufacture refractory ceramic bodies, particularly bricks, for use in corrosive/erosive environments such as fluidized bed chlorinators. As used herein, by the term, "refractory binder composition", it is meant a heat-resisting substance that promotes cohesion in high temperature-resistant ceramic materials. The refractory ceramic materials comprising the refractory binder compositions should be fired to a temperature of 1400°–1700° C. to achieve sintering and should have corrosion rates of no greater than 600 mils/yr, preferably no greater than 400 mils/yr and most preferably no greater than 100 mils/yr.

One refractory ceramic material of this invention comprises a refractory binder composition comprising about 70 to about 92% by weight of silica ($SiO_2$), and about 8 to about 30% by weight of titania ($TiO_2$) based on the weight of the binder composition. Preferably, the amount of silica is in the range of about 75 to about 90% by weight, and the amount of titania is in the range of about 10 to about 25% by weight. Within this weight percentage range of ingredients, the silica and titania form a eutectic, with a melting point of less than 1600° C.

A second refractory ceramic material of this invention comprises a refractory binder composition comprising about 35 to about 83% by weight of silica, about 4 to about 27% by weight of titania, and about 10 to about 46% by weight of alumina ($Al_2O_3$) based on the weight of binder composition. Preferably, the amount of silica is in the range of about 40 to about 73% by weight, the amount of titania is in the range of about 5 to about 24% by weight, and the amount of alumina is in the range of about 20 to about 44% by weight. Within this weight percentage range of ingredients, the silica, alumina, and titania will also form a eutectic, with a melting point of less than 1600° C., and preferably less than 1500° C.

A third refractory ceramic material of this invention comprises a refractory binder composition comprising about 35 to about 83% by weight of silica, about 4 to about 27% by weight of titania, about 10 to about 46% by weight of alumina, and about 1 to about 8% by weight of a metal oxide selected from the group consisting of calcium oxide (CaO), strontium oxide (SrO), and sodium oxide ($Na_2O$), and mixtures thereof based on the weight of the binder composition. Preferably, the amount of silica is in the range of about 40 to about 73% by weight, the amount of titania is in the range of about 5 to about 24% by weight, the amount of alumina is in the range of about 20 to about 44% by weight, and the amount of metal oxide selected from the group consisting of calcium oxide, strontium oxide, and sodium oxide, and mixtures thereof is in the range of about 3 to about 6% by weight.

Aluminum silicates, especially kaolin clay, can be used as a source to provide both silica and alumina for the binder. Kaolin clay typically contains about 40 wt. % alumina, 46 wt. % silica, and 14 wt. % water of hydration. When aluminum silicates are used to manufacture the binder, it may be necessary to add additional silica or alumina to adjust the composition of the binder in such a way to improve corrosion/erosion resistance. It is also recognized that the binder compositions of the refractory ceramic materials of this invention may contain additives such as tannin or petroleum waste as low cost surfactants and cellulose or resins as adhesive components which do not interfere with the refractory nature of the composition.

The ceramic materials of this invention comprising binder compositions can be prepared by conventional methods. The raw material components (silica, titania, alumina, calcium oxide, strontium oxide, and sodium oxide, and mixtures thereof) which may have undergone preliminary milling steps, such as in a ball mill or muller mill, are typically batch mixed in their respective proportions. Either wet or dry mixing can be performed; wet mixing in a muller is preferred. Optionally, milling can be performed after mixing and subsequent to classification.

The refractory binder compositions of the refractory ceramic materials of this invention have several advantageous properties including a relatively low melting point and/or low sintering temperature. Because of the binders relatively low melting point and/or low sintering temperature, the temperature at which a brick can be fired to full density can be lowered to a more feasible temperature, and this can result in cost savings in brick-manufacturing. Also, in some embodiments, the binder composition does not contain alkaline earth metals or other fluxing agents which can be easily chlorinated. If alkaline earth metals are present (e.g., CaO, SrO, and $Na_2O$), as in some embodiments, they are in a stabilized form which is resistant to corrosion, leaching, and chlorination. Also, the binder compositions provide a predictable melting range which allows for the production of bricks having consistent quality. In addition, the costs to manufacture the binder compositions are relatively low, and the binder compositions do not contain added components detrimental to operation of a fluid bed chlorination reactor. Further, as illustrated below in the Examples, the binder compositions of the refractory ceramic materials of this invention demonstrate improved resistance to chlorination over certain known refractory compositions.

The refractory ceramic materials comprised of refractory binders can also contain conventional refractory filler materials including, for example, metal oxides, metal nitrides, metal carbides, aluminum silicates (e.g., fireclay, calcined fireclay (grog), mullite, and cordierite), other silicates, aluminates, aluminum phosphates, rare earth phosphate blends, and mixtures thereof to prepare ceramic bodies (e.g., bricks) having improved corrosion/erosion resistance and thermal shock and spall resistance. It is preferred to use aluminum silicates such as grogs due to their superior corrosion/erosion resistance and low cost. Commonly available naturally occurring minerals which can be used as grogs (after calcination) include kyanite, sillimanite, etc. It is also recognized that the ceramic materials of this invention may contain additives such as tannin or petroleum waste as low cost surfactants and cellulose or resins as adhesive components which are added before firing of the ceramic materials and do not interfere with the refractory nature of the material.

The refractory ceramic bodies (e.g., bricks) are also prepared by conventional methods. For instance, ceramic bodies can be prepared following procedures as described in "Modern Refractory Practice", fifth edition, Harbison Walker Refractories, Pittsburgh, Pa., (1992), the disclosure of which is hereby incorporated by reference. Batch mixing (wet or dry) of filler and binder, both of which may have been subjected to preliminary milling and/or classification, is first performed. Mixing is preferably wet, with a water content of 2–20 wt. %. Milling and classification can be performed by such known techniques including muller mixing followed by screening, or sieve classification. After mixing, and optional milling and classification, the mixture is pelletized or extruded. The pellets or extrudates are then optionally pre-fired to full density, typically at a temperature of 1400°–1700° C.

The pre-fired material is then milled or ground in an apparatus such as a hammer mill, jaw crusher, jet mill, ball mill, etc., preferably a hammer mill. The milled material is then classified to obtain a particular particle size range. Additional binder and lubricant (e.g., water) is added to the classified material to assist in shape forming as needed. A final ratio of binder to filler typically is 0.05:1 to 0.3:1 (binder:filler). The binder/filler mixture can be muller-milled again, if desired.

The binder/filler mixture is then pressed or formed into the desired shape and fired. Typical firing temperatures range from 1400° C. to 1700° C. The firing of the mixture results in sintering or densification of the binder/filler mixture, resulting in low porosity and provides mechanical strength to the shaped product. An advantage of using the binders of this invention is that the firing temperature is lower than that required when binder compositions having higher melting points are used.

Bricks and other ceramic bodies having the above described compositions have improved resistance to corrosion/erosion when tested in reactive environments such as under conditions of, or which imitate those found in fluidized bed chlorination reactors. Typical conditions found in such reactors include a reaction temperature of about 900°–1300° C., and pressure of about 1–3 atmospheres. Also present in the reactor are titanium-bearing materials which can be any suitable titanium source material such as titanium-containing ores including rutile, ilmenite or anatase ore; beneficiates thereof; titanium-containing by-products or slags; and mixtures thereof. Ordinarily, the titanium-bearing material contains iron oxide in the amount of about 0.5–50%, and preferably up to about 20% by weight. Coke which is suitable for use in chlorination or titanium materials include any carbonaceous material which has been subjected to a coking process. Preferred is coke or calcined coke which is derived from petroleum or coal or mixtures of such cokes.

The refractory ceramic materials of this invention comprising refractory binder compositions should have a corrosion rate of no greater than 600 mils/yr., preferably no greater than 400 mils/yr. and most preferably no greater than 100 mils/yr. upon exposure to a $FeCl_3/Cl_2/CO$ atmosphere produced by passing $Cl_2CO/He$ at one atmosphere over iron metal powder at 1100° C. This test method is described in further detail below under the heading, "Corrosion Test". It should be understood that lower corrosion rates means better performance of the binders and materials under conditions such as those which may be present in chlorination reaction chambers.

The present invention is further illustrated by the following examples, but these examples would not be construed as limiting the scope of the invention.

EXAMPLES

Example 1

A silica-titania refractory binder composition comprising about 88 wt. % silica and 12 wt. % titania was prepared following conventional procedures. To prepare a test specimen for the following test, the binder composition was fired to a temperature of 1700° C. and allowed to cool. A test coupon was cut from the solid using a diamond saw.

Chlorination Test

In a Cahn Balance thermogravimetric analyzer (available from Cahn Instruments, Inc., Cerritos, Calif.), the silica-titania binder composition was exposed to chlorination conditions. Conditions were as follows: temperature=1300° C., CO pressure=$Cl_2$ pressure=0.176 atm., with balance of He, for a total pressure=1 atm. The rate of chlorination of the binder was determined as is expressed below in Table 1 in terms of weight loss in grams per second per square centimeter of exposed surface ($g/s/cm^2$), after approaching steady state, typically 45–200 minutes after introducing chlorine. Some conventional bricks and binder compositions were also tested for chlorination in the above manner and the results are reported below in Table 1.

TABLE 1

Chlorination Rate of Sample Compositions in $CO/Cl_2$ at 1300° C.

| | Material | Rate of chlorination ($g/s/cm^2$) |
|---|---|---|
| (1) | $SiO_2$-$TiO_2$ Binder Composition (silica-88 wt. %/titania-12 wt. %) | 0.6 to 1.4 × $10^{-7}$ |
| (2) | Fire-clay brick | 1.2 × $10^{-7}$ |
| (3) | Cristobalite silica brick (silica with a calcium silicate binder) | 2.2 × $10^{-7}$ |
| (4) | Amorphous silica refractory binder | 5 × $10^{-7}$ |

The results in Table 1 show the improved resistance to chlorination demonstrated by the refractory binder compositions of this invention over other compositions. Material (1) of this invention shows better chlorination resistance (has a lower chlorination rate) over Materials (2), (3), and (4), which are representative of refractory materials commonly used to line fluidized bed chlorinators.

Example 2

A calcined clay (−60/+200 mesh) and a refractory binder composition comprising a mixture of kaolin clay (40 wt. %—$Al_2O_3$, 46 wt. %—$SiO_2$, 14 wt. %—water of hydration) and titania were dry blended and pressed into cylindrical pellets 40 mm in diameter at a weight ratio of 85% calcined clay and 15% binder. The pellets were dried and then calcined at 1680° C. with 30 minutes residence time. Table 2 lists the densities of the pellets after firing as measured by the Archimedes method. In the Archimedes method, density is equal to (weight in air) divided by the difference between (weight in air and weight in water) times the density of water at the measurement temperature.

TABLE 2

Density of Pellets (Ceramic Materials) after Firing

| Sample | Binder Composition*** | Density (g/cc) |
|---|---|---|
| 1* (Comp.) | kaolin clay (alumina - 46 wt. % silica - 54 wt. %) | 2.54** |
| 2 | (23:1) kaolin clay:titania alumina - 44.3 wt. % silica - 50.9 wt. % titania - 4.8 wt. % | 2.55** |
| 3 | (11:1) kaolin clay:titania alumina - 42.1 wt. % silica - 48.4 wt. % titania - 9.6 wt. % | 2.58 |
| 4 | (15:1) kaolin clay:titania alumina - 43.2 wt. % silica - 49.6 wt. % titania - 7.2 wt. % | 2.57 |

*Comparative Sample

TABLE 2-continued

Density of Pellets (Ceramic Materials) after Firing

| Sample | Binder Composition*** | Density (g/cc) |
|---|---|---|

**Average based on 2 measurements
***Binder compositions calculated in the absence of water of hydration.

The results in Table 2 demonstrate the higher densities of Sample pellets (2), (3), and (4), i.e., refractory ceramic materials of this invention, in comparison to the density of Sample pellets (1).

Example 3

A series of $SiO_2/TiO_2$ and $SiO_2/TiO_2/Al_2O_3$ compositions were prepared by conventional procedures. The resulting powders were dry pressed using 3 wt. % Carbowax Sentry polyethylene glycol 8000 flake (PEG) from Union Carbide as a dry pressing aid. The PEG binder was first dissolved in methanol on a hot plate at 60° C. The powders were then added while mixing with a serrated disc impeller. The resulting slurry was then ultrasonically agitated for one minute to break-up powder agglomerates. Agitation was continued on the hot plate until the methanol evaporated. The dried powder was then hand ground in an alumina mortar and pestle and sieved to about 40 mesh. The sieved powders were uniaxially pressed into 1.5 inch diameter pellets in a double ended steel die at 3000 psi on a four post Carver press.

The pellets were fired in a CM 1700° C. Rapid Temperature box furnace at the temperatures given below. Sample pellets were supported on a bed of silica powder and exposed to the ambient furnace environment. The bedding allowed for the samples to shrink freely without warping, cracking, or contamination. Samples were heated at 8° C./min and held for 1 hour at the firing temperature. Table 3 provides the compositions of the samples and the apparent densities at several firing temperatures. Apparent density was measured geometrically by measuring the dimensions of and weighing the samples.

TABLE 3

Density as a Function of Firing Temperature

| | Apparent Density, $g/cm^3$ at Firing Temperature, °C. | | | | |
|---|---|---|---|---|---|
| Composition | 1150 | 1400 | 1500 | 1550 | 1600 |
| 88% $SiO_2$/12% $TiO_2$ | a | a | 1.5 | 2.1 | 2.1 |
| 78% $SiO_2$/22% $TiO_2$ | a | a | 1.6 | 2.3 | 2.2 |
| 80% $SiO_2$/12% $TiO_2$/8% $Al_2O_3$ | a | a | 2.2 | 2.2 | b | a Sample did not sinter.
b Sample melted.

Table 3 shows that the density of the fired body increases with firing temperature. At temperatures below 1500° C., the samples did not sinter, or show increases in density. By firing at temperatures wherein the samples did not densify, a material would not be effective for use as a binder or in a refractory ceramic materials, such as bricks. Samples, in which sintering did not occur, did not possess sufficient mechanical strength to prepare sample materials for corrosion testing. It would be expected that these samples would have very high corrosion rates (greater than 600 mils/yr.). Sample b which melted during firing was heated beyond optimal temperature to densify the material and was not tested for corrosion resistance.

A laboratory corrosion test (Corrosion Test) was used to determine the corrosion resistance of the samples.

Corrosion Test

The fired pellets from above were cut into samples 1" long by ½" wide by ⅛" thick using a Buehler Isomet diamond wafering saw. The cut samples were ultrasonically cleaned in water, then treated at 650° C. to burn out any residual organic from the cutting fluids. The cleaned samples were dried in a vacuum oven at 100° C. for 24 hours, and then weighed.

The samples were exposed for three hours at 1100° C. to an atmosphere of $Cl_2$—CO—He, with pressures of $Cl_2$= 0.492 atm, CO=0.024 atm, and He=0.483 atm, that flowed over iron metal powder at 700° C., creating $FeCl_3$ in the atmosphere. After exposure, the samples were ultrasonically cleaned in water, dried in a vacuum oven at 100° C. for 24 hours, and then weighed.

The chlorination rate in this test is equal to the corrosion rate which is calculated from weight loss measurements, and are given as D, which is reported in mils/yr. D is determined from the equation:

$$D = \frac{\Delta W}{\rho \sigma t}$$

where $\Delta W = W_o - W_i$ ($W_o$ is the initial sample weight and $W_i$ is the instantaneous sample weight, or sample weight at time t), $\rho$ is the material's density, $\sigma$ is the surface area of the sample based on dimensions of the coupon, and t is time. D can also be viewed as the rate of material thinning or the rate at which the material is uniformly corroded away at its exposed surfaces. D is also used to predict material lifetime.

TABLE 4

Corrosion Rate at 1100° C. in $CO/Cl_2/FeCl_3$ as a Function of Firing Temperature

| Composition | Chlorination rate, mils/yr, at Firing Temperature, °C. | | |
|---|---|---|---|
| | 1500 | 1550 | 1600 |
| 88% $SiO_2$/12% $TiO_2$ | 472 | 120 | 65 |
| 78% $SiO_2$/22% $TiO_2$ | 281 | 165 | 13.6 |
| 80% $SiO_2$/12% $TiO_2$/8% $Al_2O_3$ | 6.6 | 3.6 | — |

As can be seen from Table 4, corrosion rates decrease with increasing firing temperatures and increasing density. This behavior results in better performance and less material loss upon exposure to chlorinating atmospheres.

We claim:

1. A refractory ceramic material, comprising a refractory binder composition, comprising about 70 to about 92% by weight of silica, and about 8 to about 30% by weight of titania, wherein the material has been fired to a temperature in the range of 1400° to 1700° C., the material having a corrosion rate of no greater than 600 mils/yr.

2. A refractory ceramic material, comprising a refractory binder composition, comprising about 35 to about 83% by weight of silica, about 4 to about 27% by weight of titania, and about 10 to about 46% by weight of alumina, wherein the material has been fired to a temperature in the range of 1400° to 1700° C., the material having a corrosion rate of no greater than 600 mils/yr.

3. A refractory ceramic material, comprising a refractory binder composition, comprising about 35 to about 83% by weight of silica, about 4 to about 27% by weight of titania, about 10 to about 46% by weight of alumina, and about 1 to about 8% by weight of a metal oxide selected from the group consisting of calcium oxide, strontium oxide, and sodium oxide, and mixtures thereof, wherein the material has been fired to a temperature in the range of 1400° to 1700° C., the material having a corrosion rate of no greater than 600 mils/yr.

4. The refractory ceramic material of claim 1, claim 2, or claim 3, wherein the material has a corrosion rate of no greater than 400 mils/yr.

5. The refractory ceramic material of claim 1, claim 2, or claim 3, wherein the material has a corrosion rate of no greater than 100 mils/yr.

6. The refractory ceramic material of claim 1, wherein the amount of silica is in the range of about 75 to about 90% by weight, and the amount of titania is in the range of about 10 to about 25% by weight.

7. The refractory ceramic material of claim 2, wherein the amount of silica is in the range of about 40 to about 73% by weight, the amount of titania is in the range of about 5 to about 24% by weight, and the amount of alumina is in the range of about 20 to about 44% by weight.

8. The refractory ceramic material of claim 3, wherein the amount of silica is in the range of about 40 to about 73% by weight, the amount of titania is in the range of about 5 to about 24% by weight, the amount of alumina is in the range of about 20 to about 44% by weight, and the amount of metal oxide selected from the group consisting of calcium oxide, strontium oxide, and sodium oxide, and mixtures thereof is in the range of about 3 to about 6% by weight.

9. The refractory ceramic material of claim 2 or claim 3, wherein the composition comprises kaolin clay.

10. The refractory ceramic material of claim 1, claim 2, or claim 3, wherein the material is a brick.

11. The refractory brick material of claim 10, further comprising a refractory filler composition selected from the group consisting of metal oxides, metal nitrides, metal carbides, silicates, aluminates, and mixtures thereof.

12. A method for chlorinating titanium-bearing material, wherein particulate coke, particulate titanium-bearing material and chlorine are reacted in a reactor at a temperature of 900° to 1300° C. and at a pressure of 1 to 3 atmospheres, wherein the reactor has a lining comprising the refractory ceramic material of claim 1, claim 2, or claim 3.

* * * * *